(12) United States Patent
Treton et al.

(10) Patent No.: US 11,773,801 B2
(45) Date of Patent: Oct. 3, 2023

(54) DIAGNOSIS OF THE CONDITION OF A PUMP IN AN INJECTION SYSTEM FOR DIESEL ENGINE

(71) Applicant: VITESCO TECHNOLOGIES GMBH, Regensburg (DE)

(72) Inventors: Lionel Treton, Toulouse (FR); Jérémie Memain, Toulouse (FR); Thibaut Polidore, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 17/793,253

(22) PCT Filed: Jan. 6, 2021

(86) PCT No.: PCT/EP2021/050125
§ 371 (c)(1),
(2) Date: Jul. 15, 2022

(87) PCT Pub. No.: WO2021/144175
PCT Pub. Date: Jul. 22, 2021

(65) Prior Publication Data
US 2023/0054369 A1 Feb. 23, 2023

(30) Foreign Application Priority Data
Jan. 17, 2020 (FR) ..................................... 2000481

(51) Int. Cl.
*F02D 41/22* (2006.01)
*F02D 41/38* (2006.01)

(52) U.S. Cl.
CPC ......... *F02D 41/22* (2013.01); *F02D 41/3836* (2013.01); *F02D 41/3845* (2013.01);
(Continued)

(58) Field of Classification Search
CPC .. F02D 41/22; F02D 41/3836; F02D 41/3845; F02D 2041/226;
(Continued)

(56) References Cited

U.S. PATENT DOCUMENTS 5,723,780 A 3/1998 Miwa et al.
8,820,299 B2 * 9/2014 Kojima ............... F02D 41/3082
123/457

(Continued)

FOREIGN PATENT DOCUMENTS

JP 2011-064100 3/2011

OTHER PUBLICATIONS

International Search Report for PCT/EP2021/050125, dated Apr. 22, 2021, 4 pages.
(Continued)

*Primary Examiner* — Hai H Huynh
(74) *Attorney, Agent, or Firm* — NIXON & VANDERHYE

(57) ABSTRACT

Disclosed is a method for controlling an engine torque for a diesel engine, characterized in that the engine torque control is implemented in an injection system. The injection system in question includes a high-pressure pump controlled by an engine control unit, the high-pressure pump supplying a fuel supply rail, the pump being dimensioned to be capable of delivering a capacity volume of compressible fuel for each combustion cycle of the diesel engine. It also includes a pressure sensor for measuring the pressure of the fuel in the fuel rail.

20 Claims, 2 Drawing Sheets

(52) U.S. Cl.
CPC ............ *F02D 2041/226* (2013.01); *F02D 2200/0602* (2013.01); *F02D 2200/0604* (2013.01); *F02D 2200/0614* (2013.01); *F02D 2200/0616* (2013.01); *F02D 2200/1002* (2013.01)

(58) Field of Classification Search
CPC ..... F02D 2200/0602; F02D 2200/0604; F02D 2200/0614; F02D 2200/0616; F02D 2200/1002
USPC ............ 123/446, 456, 457, 497, 510, 511
See application file for complete search history.

(56) References Cited

U.S. PATENT DOCUMENTS

| | | |
|---|---|---|
| 2005/0103312 A1 | 5/2005 | Uchiyama |
| 2014/0053812 A1 | 2/2014 | Kojima |

OTHER PUBLICATIONS

Written Opinion of the ISA for PCT/EP2021/050125, dated Apr. 22, 2021, 7 pages.

\* cited by examiner

DIAGNOSIS OF THE CONDITION OF A PUMP IN AN INJECTION SYSTEM FOR DIESEL ENGINE

CROSS-REFERENCE TO RELATED PRIORITY APPLICATIONS

This application is the U.S. national phase of International Application No. PCT/EP2021/050125 filed Jan. 6, 2021, which designated the U.S. and claims priority to FR Patent Application No. 2000481 filed Jan. 17, 2020, the entire contents of each of which are hereby incorporated by reference.

BACKGROUND OF THE INVENTION

Field of the Invention

The present invention relates to a method for controlling an engine torque for a diesel engine and in particular for limiting the engine torque when the pump is in a beyond-capacity state.

Description of the Related Art

In diesel injection engines, the engine torque requested by the user corresponds mechanically to the fuel injection system injecting a determined quantity of fuel into the various cylinders of the engine. This system generally comprises injectors designed to inject fuel into respective cylinders, and a rail for supplying the injectors with fuel, the fuel being pressurized by a high-pressure pump controlled by an engine control unit (more generally known as the ECU).

High-pressure pumps are dimensioned to meet particular specifications and in particular to be capable of delivering a determined volume of compressed fuel corresponding to a determined torque demand over a combustion cycle.

However, during a combustion cycle, fuel injections are not always performed with the aim of creating engine torque (main injection). Indeed, it is for example possible to have injections intended to regenerate the particulate filter (post injection) or simply pre-injections to begin to increase the pressure in the combustion chamber; these injections contribute little or nothing to the generation of engine torque. The pumps are not always dimensioned to take into account these additional fuel demands that were not provided for in the specifications. To that extent, it may happen that a pump cannot always compress the quantity of fuel to be injected as requested by the ECU since it has not been dimensioned to both respond to a determined torque and also inject fuel in order to regenerate the particle filter in the same combustion cycle. In this case, a faulty pump state diagnosis is raised when in reality the pump is functional but momentarily beyond capacity. The pump must then be replaced even though it is in accordance with the specifications and has been temporarily unable to meet the requested fuel demand.

There are solutions that directly limit the engine torque so that the pump never ends up beyond capacity. One example is document FR2806756A1, in which the quantity of fuel to be injected is fixed at a maximum value. This quantity is advantageously chosen so that the quantity of fuel to be injected is never greater than the capacity of the pump. These solutions are not satisfactory insofar as the engine torque is permanently limited whereas the situation in which the pump is beyond capacity is only temporary.

In this respect, there is a need to be able to detect, in real time, when a pump is temporarily beyond capacity in order to be able to prevent a faulty pump diagnosis from being raised.

SUMMARY OF THE INVENTION

One aim of the present application is therefore to propose a method making it possible to prevent a faulty pump diagnosis from being raised, and therefore to identify when the pump is simply beyond capacity.

A second aim is to advantageously limit the engine torque so that the other functions requiring fuel can be implemented even when the pump is in a beyond-capacity state.

A third aim is to be able to return to an engine torque in normal operation after the engine torque has been limited.

Finally, a last aim is to minimize as much as possible the impact on the user during these engine torque modifications.

In this respect, the present application proposes a method for controlling an engine torque for a diesel engine, characterized in that the engine torque control is implemented in an injection system. The injection system thus comprises a high-pressure pump controlled by an engine control unit, the high-pressure pump supplying a fuel supply rail, the pump being dimensioned to be capable of delivering a capacity volume of compressible fuel for each combustion cycle of the diesel engine. The injection system also includes a pressure sensor for measuring the pressure of the fuel in the fuel rail.

The method comprises the following steps making it possible to prevent a faulty pump diagnosis from being raised and therefore to identify when the pump is simply beyond capacity, the pump being functional in accordance with its specifications, but momentarily beyond capacity owing to the volume command:

sending, from the engine control unit to the pump, for each combustion cycle of the diesel engine, a command for the volume of fuel to be injected and a setpoint pressure making it possible to deliver said volume,
  measuring, using the pressure sensor, the pressure on the supply rail,
  monitoring a beyond-capacity operating state of the high-pressure pump, on the basis of the volume command, the setpoint pressure and the measured pressure, and
  when a beyond-capacity operating state of the pump is detected, limiting the engine torque to a first determined value for the following combustion cycle.

In one embodiment, a beyond-capacity operating state of the pump is detected when:
  the volume command for the volume to be injected is greater than the capacity volume of the pump,
  the pressure measured by the sensor is lower than the setpoint pressure sent by the engine control unit, and
  the pump has an activity rate above a determined threshold.

In one embodiment, the pressure measured by the sensor must be at least below a first determined threshold with respect to the setpoint for a beyond-capacity state to be detected.

In one embodiment, the command for the volume of fuel to be injected comprises a volume corresponding to the volume delivered during a main injection of fuel and the limiting of the engine torque corresponds to the limiting of the volume to be injected.

In one embodiment, a faulty state of the pump is detected when:

the volume command for the volume to be injected is lower than the volume of the pump, and the pressure measured by the sensor is lower than the setpoint pressure sent by the engine control unit, or the pump has an activity rate above a determined threshold.

In one embodiment, when the engine torque has been limited during a first engine combustion cycle, and at the end of the following combustion cycle, the difference between the setpoint pressure sent by the engine control unit and the pressure measured by the sensor is:

between the first determined threshold and a second determined threshold, the second determined threshold being lower than the first determined threshold, the limiting of the engine torque remains at the first determined value, or lower than said second determined threshold, the limiting of the engine torque is raised to a second determined value that is greater than the first determined value or, greater than the first determined threshold, the limiting of the engine torque is lowered to a third determined value that is lower than the first determined value.

The invention also relates to an engine control unit designed to control a high-pressure pump of an injection system for a diesel engine. The injection system comprises a fuel supply rail supplied by the pump. The latter is dimensioned to be able to deliver a capacity volume of compressible fuel for each combustion cycle of the diesel engine. The injection system also includes a pressure sensor for measuring the pressure of the fuel in the fuel rail.

The engine control unit further comprises a memory in which is stored the value of the capacity volume, and being characterized in that it is configured to implement the following steps:

determining a volume of fuel to be compressed by the pump, for each engine combustion cycle, on the basis of at least one item of information, the at least one item of information comprising an engine torque of the diesel engine, determining, for each engine combustion cycle, a setpoint pressure on the basis of a requested engine torque and a current engine speed, receiving the pressure of the fuel in the supply rail as measured by the pressure sensor, comparing the setpoint pressure and the at least one pressure value, establishing a diagnosis of the operating state of the pump from the comparison, an activity rate of the pump, the determined volume and the capacity volume value stored in the memory.

In one embodiment, when the pump is in a beyond-capacity operating state, the engine control unit is designed to implement an additional step of limiting the engine torque to a first determined value for the following combustion cycle.

Finally, the invention relates to a computer program product, comprising code instructions for the implementation of the steps of the engine control unit above.

The method presented therefore makes it possible to identify when the pump is in a beyond-capacity operating state. This makes it possible to avoid raising a faulty pump diagnosis while the pump still meets the specifications for which it was dimensioned. In addition, limiting the engine torque when the pump is beyond capacity makes it possible to release some volume of fuel so that the other functions which are dependent thereon can still be implemented. The engine torque is advantageously gradually increased to a requested operating value to limit the impact of a sudden change in torque on the user.

BRIEF DESCRIPTION OF THE DRAWINGS

Other features, details and advantages will emerge upon reading the following detailed description and from examining the appended drawings, in which.

DESCRIPTION OF THE EMBODIMENTS

Figure 2:
FIG. 2 presents an embodiment of a diesel engine injection system for implementing the engine torque control method for a diesel engine.
Figure 2:
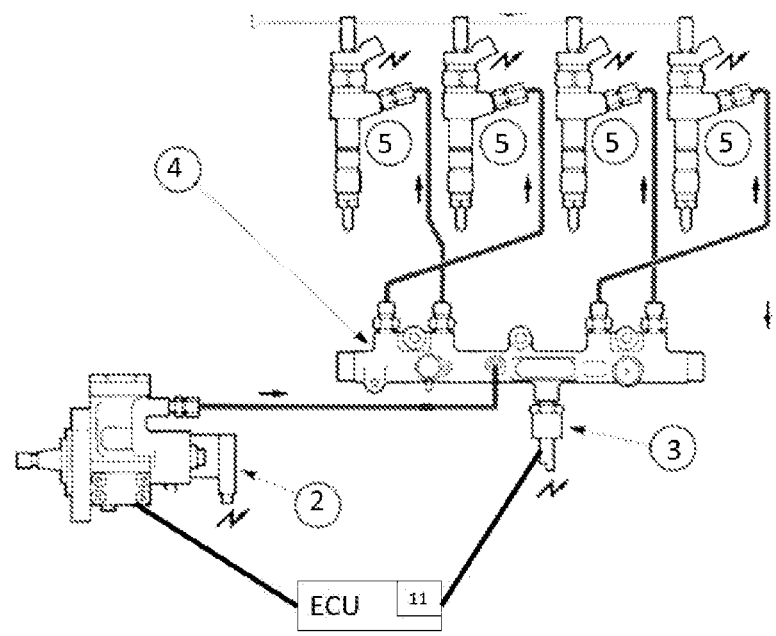

Reference is now made to [FIG. 2] showing an embodiment of a diesel engine injection system.

The diesel engine injection system 1 comprises a high-pressure pump 2 controlled by an engine control unit ECU having a memory 11. The engine control unit ECU can be, for example, a processor, a microprocessor or even a microcontroller. The memory 11 includes code instructions executed by the engine control unit ECU. The high-pressure pump 2 supplies fuel to a fuel supply rail 4. The latter is connected to a plurality of injectors 5 which inject fuel into cylinders of the diesel engine. The injection system 1 further comprises a pressure sensor 3, so as to be able to measure the pressure to which the fuel is subjected in the supply rail 4.

The pump 2 is dimensioned to be able to deliver a capacity volume $V_c$, corresponding to a maximum volume of compressible fuel to create engine torque, and this at each combustion cycle of the diesel engine, when said pump is at its lowest efficiency. Lowest efficiency, is to be understood as meaning that the efficiency of the pump decreases with use and that below said lowest efficiency, the pump is no longer able to meet its specifications.

Figure 1:
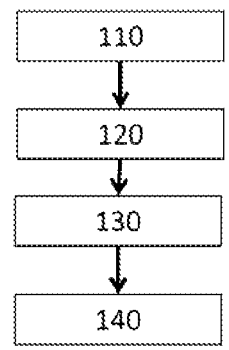
FIG. 1 presents a method for controlling an engine torque for a diesel engine according to one embodiment.

There follows a description of a method for controlling an engine torque for a diesel engine, this being depicted in FIG. 1, this method comprises a plurality of steps which are implemented in the injection system 1 of the diesel engine presented above.

Thus, a first step of the method for controlling an engine torque comprises sending 110, from the engine control unit ECU to the pump 2, a command for the volume V of fuel to be injected and a setpoint pressure $P_{ECU}$, the setpoint pressure being a setpoint of pressure values in the supply rail throughout the injection making it possible to deliver said volume V during an engine combustion cycle. Sending 110 is therefore performed at each combustion cycle of the diesel engine.

The command for the volume V of fuel to be injected comprises a volume $V_{ip}$ of fuel to be injected during a main fuel injection. The main injection is the injection used to create the engine torque requested by the user. There is a direct correlation between the volume $V_{ip}$ delivered during the main injection and the driving torque of the diesel engine.

A second step of the method comprises measuring 120, using the pressure sensor 3, the pressure $P_{rail}$ fuel in the supply rail 4 throughout the injection phase of the combustion cycle. Theoretically, the measurement 120 of the pressure $P_{rail}$ must correspond at all times to the setpoint pressure $P_{ECU}$.

A third step of the method comprises monitoring 130 a beyond-capacity operating state of the high-pressure pump, on the basis of the volume command V, the setpoint pressure $P_{ECU}$ and the measured pressure $P_{rail}$ This monitoring is implemented at the same time as step 120, so that the operation of the pump is monitored throughout the injection phase of the combustion cycle.

Three possible states of the pump 2 are defined below: a normal operating state, a beyond-capacity operating state and a faulty state.

A normal operating state of the pump corresponds to operation in which the pump is neither in a beyond-capacity state nor in a faulty state, that is to say that it can satisfy the command for the volume of fuel to be injected and the setpoint pressure during the combustion cycle.

The beyond-capacity state of the pump means that the pump, during a combustion cycle, cannot deliver the command for the volume V of fuel to be injected, although it still complies with its specifications.

A beyond-capacity state of pump 2 is detected when the following conditions are met:
the volume command V for the volume to be injected is greater than the capacity volume $V_c$ of the pump 2 ($V>V_c$),
the pressure $P_{rail}$ measured by the sensor 3 is lower than the setpoint pressure $P_{ECU}$ sent by the ECU command control unit ($P_{rail}<P_{ecu}$), or advantageously if a difference between the setpoint pressure $P_{ECU}$ and the measured pressure $P_{rail}$ is greater than a first determined threshold T1, and
pump 2 has an activity rate higher than another determined threshold.

The fact that the pump is beyond capacity also implies that the engine speed is quite high. Therefore, a set of parameters such as engine speed, engine torque, fuel temperature, are preferably also monitored, and it can further be verified that the following conditions are satisfied to detect a beyond-capacity state of the pump 2:
the engine is at a speed above a determined threshold $T_{regM}$,
the engine torque is greater than a determined threshold $T_{couple}$
the setpoint pressure $P_{ECU}$ is greater than a determined threshold $T_{ECU}$
the pressure in the rail $P_{rail}$ is greater than a determined threshold $T_{rail}$, and
the fuel temperature is above a determined threshold $T_{temp}$.

These conditions are preferably monitored for each combustion cycle of the diesel engine.

Advantageously, the activity rate threshold of the pump 2 is between 90 and 99%, for example equal to 95%.

The beyond-capacity operating state is to be distinguished from a faulty pump operating state in which the pump is no longer able to deliver a volume of fuel that meets its specifications.

A faulty state of the pump is detected when:
the volume command V for the volume to be injected is lower than the volume $V_c$ of the pump 2 ($V<V_c$), and
at least one of the following conditions is combined with that stated above:
the pressure $P_{rail}$ measured by the sensor 3 is lower than the setpoint pressure $P_{ECU}$ sent by the ECU command control unit ($P_{rail}<P_{ecu}$), or advantageously a difference between the setpoint pressure $P_{ECU}$ and the measured pressure $P_{rail}$ is greater than a first determined threshold T1, and
pump 2 has an activity rate above the determined threshold described above.

An additional step of the method is implemented when the pump is in a beyond-capacity state. This is a fourth stage of limiting 140 the engine torque to a first determined value for the combustion cycle directly following the cycle during which the pump was diagnosed as being beyond capacity. The first value determined is advantageously the value of the engine torque of the cycle during which the pump was diagnosed as being beyond capacity, or a value lower than this, for example lower by 5% or 10%. The limiting 140 of the engine torque corresponds to the limiting of the volume $V_{ip}$ of fuel of the main injection. As explained above, it is the main injection that creates the required engine torque. In addition, the main injection is the one that requires the greatest fuel volume among the injections carried out to respond to the volume command V. Limiting the engine torque makes it possible to release some volume of fuel in order to be able to carry out the other requested injections, which will be ensured by a normal engine strategy. Examples of other injections can be, for example, pre-injections with the aim of raising the pressure in the combustion chamber or even post-injections to regenerate the particle filter.

Moreover, since the beyond-capacity state is only temporary, it is not necessary to permanently limit the engine torque. Thus, when the engine torque has been limited during a first engine combustion cycle, and at the end of the following combustion cycle, the difference between the setpoint pressure $P_{ECU}$ sent by the engine control unit ECU and the measured pressure $P_{rail}$ is:
greater than a second determined threshold T2, the limiting of the engine torque remains unchanged and is therefore equal to the first determined value, or
lower than said second determined threshold T2, the limiting of the engine torque is raised to a second determined value that is greater than the first determined value.

The second threshold T2 is advantageously lower than the first threshold T1 to avoid immediately increasing the value of the maximum torque if the difference between the setpoint pressure and the measured pressure oscillates around the first threshold T1.

Advantageously, if the difference between the setpoint pressure $P_{ECU}$ sent by the engine control unit ECU and the measured pressure $P_{rail}$ is greater than the first determined threshold T1, the limiting of the engine torque has dropped to a third determined value that is lower than the first determined value.

Three scenarios are therefore outlined below:
The first case in which the limiting that restricts the engine torque is unchanged if the pump is still not capable, in the cycle following the limiting, of delivering the fuel volume command V.
The second case in which, when the difference is less than the second determined threshold T2, it is estimated that the limiting of the engine torque can be raised to a second determined value.

The second determined value is advantageously between the first determined value to which the engine torque has been limited and the torque value requested by the user for the current combustion cycle. This involves raising the torque limiting gradually until it responds to the user's engine torque request (which may be much higher than during the limiting) in order to smooth the impact the modification of the engine torque on the user. In a concrete case, this makes it possible to avoid feeling a sudden sensation of acceleration for a driver of a vehicle when the pump is once again within capacity and the torque requested is much higher than the limited torque.

The third case, in which pump 2, after the limiting of the engine torque, is still not within capacity, but unlike the first case, the difference between the setpoint pressure $P_{ECU}$ and the pressure $P_{rail}$ is still greater than the determined threshold T1.

It is therefore a question of limiting the torque to a third determined value that is lower than the first determined value. For example, the third determined value may be less than the first determined value by 5 or 10%.

Figure 3:
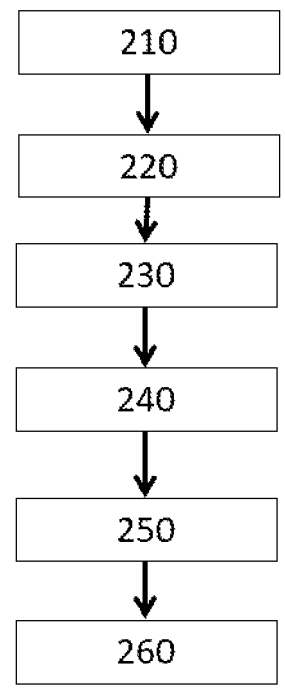
FIG. 3 presents a succession of steps implemented by an engine control unit for carrying out the method.

The present application also proposes an engine control unit ECU designed to control a high-pressure pump 2 of an injection system 1 such as described above. The pump 2 is dimensioned to be able to deliver at least a capacity volume $V_c$, corresponding to a maximum volume of compressible fuel, and this at each combustion cycle of the diesel engine, when said pump is at its lowest efficiency. The engine control unit ECU comprises a memory 11 which stores the value of said capacity volume $V_c$ of compressible fuel. The engine control unit ECU is further configured to implement a plurality of successive steps shown in FIG. 3. These steps are the steps performed by the engine control unit ECU to allow the previously presented engine torque control method for a diesel engine to be carried out.

Thus, the memory 11 of the engine control unit stores the instructions for implementing said steps described below.

The engine control unit ECU performs a first step 210 of determining a volume V of fuel to be compressed by the pump 2 on each combustion cycle of the diesel engine. This volume V is determined from at least one item of information comprising information relating to an engine torque. The at least one item of information can optionally but advantageously comprise information relating to a pre-injection and/or to the regeneration of the particulate filter.

The control unit ECU then performs a second step of determining 220 a setpoint pressure $P_{ECU}$ from a torque requested by the user and a current engine speed. This determination is also made for each combustion cycle of the diesel engine. The aim here is to determine the setpoint pressure that the pump 2 must follow in order to perform good combustion.

At the end of the second step, the control unit receives 230, in a third step, a measured pressure $P_{rail}$ of the pump 2 measured by the pressure sensor 3 throughout the combustion cycle.

It then implements a fourth comparison step 240 of comparing the setpoint pressure $P_{ECU}$ and the measured pressure $P_{rail}$. This involves determining whether the measured pressure $P_{rail}$ indeed follows the setpoint pressure $P_{ECU}$.

In a fifth step, the measurement unit ECU establishes 250 a diagnosis of the operating state of the pump 2 from the comparison 240, an activity rate of the pump, the determined volume V and the capacity volume value $V_c$ stored in the memory 11. The conditions under which the pump would be in one or the other of the states were explained previously.

When the pump is diagnosed as being in a beyond-capacity state, the engine control unit ECU implements an additional step of limiting 260 the engine torque to a determined value for the combustion cycle following the diagnosis. It is therefore, as detailed above, a question of limiting the volume $V_{ip}$ of the main injection of the next combustion cycle.

The invention claimed is:

1. A method for controlling an engine torque for a diesel engine, engine torque control being implemented in an injection system including a high-pressure pump controlled by an engine control unit, the high-pressure pump supplying a fuel supply rail, the pump being configured to deliver a capacity volume of compressible fuel for each engine combustion cycle of a plurality of engine combustion cycles of the diesel engine, the injection system including a pressure sensor configured to measure the pressure of the fuel in the supply rail, the method comprising, to prevent a faulty pump diagnosis from being raised and to identify when the pump is simply beyond capacity:

sending, from the engine control unit to the pump, for each combustion cycle of the diesel engine, a command for the volume of fuel to be injected and a setpoint pressure enabling delivery of said volume of fuel;

measuring, using the pressure sensor, the pressure on the supply rail;

monitoring a beyond-capacity operating state of the high-pressure pump in which the high-pressure pump is functional in accordance with its specifications but momentarily beyond capacity owing to the volume command, based on (i) the volume command being greater than the capacity volume of the pump, (ii) the setpoint pressure, and (iii) the measured pressure; and when the beyond-capacity operating state of the pump is detected, limiting the engine torque to a first determined value for a subsequent combustion cycle.

2. The method as claimed in claim 1, wherein the beyond-capacity operating state of the pump is detected when:

the pressure measured by the sensor is lower than the setpoint pressure sent by the engine control unit, and the pump has an activity rate above a determined threshold.

3. The method as claimed in claim 2, wherein the beyond-capacity state is detected when the pressure measured by the sensor is at least below a first determined pressure threshold with respect to the setpoint.

4. The method as claimed in claim 3, wherein, when the engine torque is limited during a first engine combustion cycle of the plurality of engine combustion cycles, and at the end of the subsequent combustion cycle of the plurality of engine combustion cycles, the difference between the setpoint pressure sent by the engine controller and the pressure measured by the sensor is one of:

(i) between the first predetermined threshold and a second predetermined threshold, the second predetermined threshold being lower than the first predetermined threshold, the limiting of the engine torque remaining at the first determined value, (ii) lower than said second predetermined threshold, the limiting of the engine torque being raised to a second determined value that is greater than the first determined value, and (iii) greater than the first predetermined threshold, the limiting of the engine torque being lowered to a third determined value that is lower than the first determined value.

5. The method as claimed in claim 3, wherein the volume command for the volume of fuel to be injected comprises a volume corresponding to the volume delivered during a main injection of fuel, and wherein the limiting of the limiting of the engine torque corresponds to limiting of the volume to be injected.

6. The method as claimed in claim 5, wherein a faulty state of the pump is detected when:
   the volume command for the volume to be injected is lower than the volume of the pump, and
   one of: (i) the pressure measured by the sensor is lower than the setpoint pressure sent by the engine control unit, and (ii) the pump has an activity rate above a predetermined threshold.

7. The method as claimed in claim 3, wherein a faulty state of the pump is detected when:
   the volume command for the volume to be injected is lower than the volume of the pump, and
   one of: (i) the pressure measured by the sensor is lower than the setpoint pressure sent by the engine control unit, and (ii) the pump has an activity rate above a predetermined threshold.

8. A non-transitory computer-readable medium on which is stored a computer program, comprising program code instructions for carrying out the method as claimed in claimed in claim 3 when said program is executed on a computer.

9. The method as claimed in claim 2, wherein the volume command for the volume of fuel to be injected comprises a volume corresponding to the volume delivered during a main injection of fuel, and
   wherein of the limiting engine torque corresponds to limiting of the volume to be injected.

10. The method as claimed in claim 9, wherein a faulty state of the pump is detected when:
    the volume command for the volume to be injected is lower than the volume of the pump, and
    one of: (i) the pressure measured by the sensor is lower than the setpoint pressure sent by the engine control unit, and (ii) the pump has an activity rate above a predetermined threshold.

11. The method as claimed in claim 2, wherein a faulty state of the pump is detected when:
    volume command for the volume to be the injected is lower than the volume of the pump, and
    one of: (i) the pressure measured by the sensor is lower than the setpoint pressure sent by the engine control unit, and (ii) the pump has an activity rate above a predetermined threshold.

12. A non-transitory computer-readable medium on which is stored a computer program, comprising program code instructions for carrying out the the method as claimed in claim 2 when said program is executed on a computer.

13. The method as claimed in claim 1, wherein the volume command for the volume of fuel to be injected comprises a volume corresponding to the volume delivered during a main injection of fuel, and
    wherein the limiting of the engine torque corresponds to limiting of the volume to be injected.

14. The method as claimed in claim 13, wherein a faulty state of the pump is detected when:
    the volume command for the volume to be injected is lower than the volume of the pump, and
    one of: (i) the pressure measured by the sensor is lower than the setpoint pressure sent by the engine control unit, and (ii) the pump has an activity rate above a predetermined threshold.

15. A non-transitory computer-readable medium on which is stored a computer program, comprising program code instructions for carrying out the method as claimed in claim 13 when said program is executed on a computer.

16. The method as claimed in claim 1, wherein a faulty state of the pump is detected when:
    the volume command for the volume to be injected is lower than the volume of the pump, and
    one of: (i) the pressure measured by the sensor is lower than the setpoint pressure sent by the engine control unit, and (ii) the pump has an activity rate above a predetermined threshold.

17. A non-transitory computer-readable medium on which is stored a computer program, comprising program code instructions for carrying out the method as claimed in claim 16 when said program is executed on a computer.

18. A non-transitory computer-readable medium on which is stored a computer program, comprising program code instructions for carrying out the method as claimed in claim 1 when said program is executed on a computer.

19. An engine control unit configured to control a high-pressure pump of an injection system for a diesel engine, said injection system including a fuel supply rail supplied by the high-pressure pump, the high-pressure pump being configured to deliver a capacity volume of compressible fuel for each combustion cycle of a plurality of combustion cycles of the diesel engine, the injection system including a pressure sensor configured to measure the pressure of the fuel in the supply rail, the engine control unit comprising:
    a memory in which is stored the value of the capacity volume,
    wherein the engine control unit is configured to:
        determine a volume of fuel to be compressed by the pump, for each of the engine combustion cycles, based on at least one item of information, the at least one item of information comprising an engine torque of the diesel engine,
        determine, for each of the engine combustion cycles, a setpoint pressure based on a requested engine torque and a current engine speed,
        receive at least one the pressure value of the fuel in the supply rail as measured by the pressure sensor,
        compare the setpoint pressure and the at least one pressure value, and
        establish a diagnosis of the operating state of the pump from the comparing, an activity rate of the pump, the determined volume, and the capacity volume value stored in the memory.

20. The engine control unit as claimed in claim 19, wherein, when the pump is in a beyond-capacity operating state, the engine control unit is configured to limit the engine torque to a first determined value for the subsequent combustion cycle.

* * * * *